(12) United States Patent  (10) Patent No.: US 8,719,341 B2
Issa et al.  (45) Date of Patent: *May 6, 2014

(54) SYSTEM AND METHOD FOR ACCESSING AND MANAGING MOBILE DEVICE METADATA

(75) Inventors: Alfredo C. Issa, Apex, NC (US);
Richard J. Walsh, Raleigh, NC (US);
Christopher M. Amidon, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 943 days.

This patent is subject to a terminal disclaimer.

(21) Appl. No.: 11/318,662

(22) Filed: Dec. 27, 2005

(65) Prior Publication Data

US 2007/0150479 A1  Jun. 28, 2007

(51) Int. Cl.
*G06F 15/16* (2006.01)
*H04N 5/781* (2006.01)

(52) U.S. Cl.
USPC ........... 709/204; 386/124; 386/125; 709/217; 709/218; 709/219

(58) Field of Classification Search
USPC ........................................ 709/204
See application file for complete search history.

(56) References Cited

U.S. PATENT DOCUMENTS

| | | | |
|---|---|---|---|
| 5,666,661 | A | 9/1997 | Grube et al. |
| 5,995,500 | A | 11/1999 | Ma et al. |
| 6,020,810 | A | 2/2000 | Har-Even |
| 6,052,122 | A | 4/2000 | Sutcliffe et al. |
| 6,415,146 | B1 | 7/2002 | Capece |
| 6,542,749 | B2 | 4/2003 | Tanaka et al. |
| 6,549,768 | B1 | 4/2003 | Fraccaroli |
| 6,580,704 | B1 | 6/2003 | Wellig et al. |
| 6,744,750 | B1 | 6/2004 | Berger |
| 6,757,684 | B2 | 6/2004 | Svendsen et al. |
| 6,819,919 | B1 | 11/2004 | Tanaka |
| 7,447,656 | B2 * | 11/2008 | Parthasarathy ................. 705/38 |
| 7,580,867 | B2 | 8/2009 | Nykamp |

(Continued)

FOREIGN PATENT DOCUMENTS

| | | |
|---|---|---|
| WO | 00/15847 A2 | 3/2000 |
| WO | 01/75672 A1 | 10/2001 |
| WO | W02004080103 A1 | 9/2004 |

OTHER PUBLICATIONS

Ad hoc protocol list, http://en.wikipedia.org/wiki/Ad_hoc_protocol_list.

(Continued)

*Primary Examiner* — Joseph Greene
(74) *Attorney, Agent, or Firm* — Withrow & Terranova, PLLC

(57) ABSTRACT

A system and method are provided for accessing and managing information, or metadata, describing content residing on a number of agent devices. In general, the system includes a central node and a number of agent devices communicatively coupled by a network. In operation, the central node communicates with the agent devices to obtain content information describing content stored at the agent devices and optionally the locations of the agent devices from the agent devices. The content information and optionally the locations of the agent devices are stored in a database associated with the central node. Thereafter, the central node enables requesting nodes such as the agent devices to access the database. In addition or alternatively, the central node may provide automatic alerts to the agent devices when other agent devices matching specified criteria are available.

9 Claims, 5 Drawing Sheets

(56) References Cited

U.S. PATENT DOCUMENTS

| | | |
|---|---|---|
| 7,793,321 B2 * | 9/2010 | Simms et al. .................. 725/39 |
| 7,859,560 B1 | 12/2010 | Issa |
| 8,000,695 B2 | 8/2011 | Florkey et al. |
| 2002/0090911 A1 | 7/2002 | Evans et al. |
| 2003/0043070 A1 * | 3/2003 | Soliman .................. 342/357.09 |
| 2003/0045296 A1 | 3/2003 | Burr |
| 2003/0126213 A1 | 7/2003 | Betzler |
| 2003/0208621 A1 * | 11/2003 | Bowman ...................... 709/242 |
| 2004/0002348 A1 | 1/2004 | Fraccaroli |
| 2004/0009750 A1 | 1/2004 | Beros et al. |
| 2004/0120298 A1 | 6/2004 | Evans et al. |
| 2004/0185881 A1 | 9/2004 | Lee et al. |
| 2004/0203363 A1 | 10/2004 | Carlton et al. |
| 2005/0038876 A1 | 2/2005 | Chaudhuri |
| 2005/0120380 A1 * | 6/2005 | Wolfe ........................... 725/100 |
| 2005/0174975 A1 | 8/2005 | Mgrdechian et al. |
| 2005/0227676 A1 | 10/2005 | De Vries |
| 2006/0008256 A1 * | 1/2006 | Khedouri et al. ............. 386/124 |
| 2007/0032240 A1 | 2/2007 | Finnegan et al. |

OTHER PUBLICATIONS

Mobile Ad-hoc Networks (manet) Charter, http://www.ietf.org/html.charters/manet-charter.html.

International Search Report and Written Opinion for PCT/US2006/62294.

* cited by examiner

| ID | LOCATION | TYPE | FOLDER | PHOTO ALBUM NAME | KEYWORDS | MUSIC GENRE | MUSIC ARTIST | MUSIC ALBUM | FILE NAME |
|---|---|---|---|---|---|---|---|---|---|
| 1 | 35.626263 N 78.845816 W | IMAGE | PETS | PETS | CAT, FLUFFY | — | — | — | FLUFFY.JPEG |
| 1 | 35.626263 N 78.845816 W | IMAGE | PETS | PETS | DOG, SPIKE | — | — | — | SPIKE.JPEG |
| 1 | 35.626263 N 78.845816 W | IMAGE | PETS | PETS | CAT, FLUFFY | — | — | — | FLUFFY2.JPEG |
| 2 | 35.764119 N 78.778568 W | MUSIC | GEORGE BENSON | — | — | JAZZ | GEORGE BENSON | BREEZIN | BREEZIN.MP3 |
| 2 | 35.764119 N 78.778568 W | MUSIC | AC/DC | — | — | ROCK | AC/DC | BACK IN BLACK | HELLS BELLS.MP3 |
| N | 35.82195 N 78.65875 W | MUSIC | BARRY MANILOW | — | — | CONTEMPORARY | BARRY MANILOW | ULTIMATE MANILOW | COPACABANA.MP3 |

*FIG. 2*

SYSTEM AND METHOD FOR ACCESSING AND MANAGING MOBILE DEVICE METADATA

FIELD OF THE INVENTION

The present invention relates to accessing and managing content information, or metadata, describing content stored on a number of mobile or stationary devices.

BACKGROUND OF THE INVENTION

Content stored by mobile devices such as mobile telephones, Personal Digital Assistants (PDAs), digital media players, and the like can provide valuable information regarding the preferences of the users. The preferences of the users would be valuable for identifying participants for a chat session, identifying participants for an ad-hoc network, generating a play list for a nearby media player, and the like. Accordingly, there remains a need for easily managing and accessing content information describing content stored on mobile devices.

SUMMARY OF THE INVENTION

The present invention relates to a system and method for accessing and managing information, or metadata, describing content residing on a number of agent devices. In general, the system includes a central node communicatively coupled to a number of agent devices by a network. In operation, the central node communicates with the agent devices to obtain content information describing content stored at the agent devices, and optionally, the locations of the agent devices. The content information and optionally the locations of the agent devices are stored in a database associated with the central node. Thereafter, the central node enables requesting nodes such as the agent devices to access the database. For example, the agent devices may communicate with the central node to obtain the content information for one or more known agent devices or to query the database to find agent devices having content information, and optionally, locations that satisfy specified criteria. As another example, the central node may provide automatic alerts to the agent devices when other agent devices matching specified criteria are available.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2 is a table illustrating an exemplary embodiment of the database maintained at the central node of FIG. 1 according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
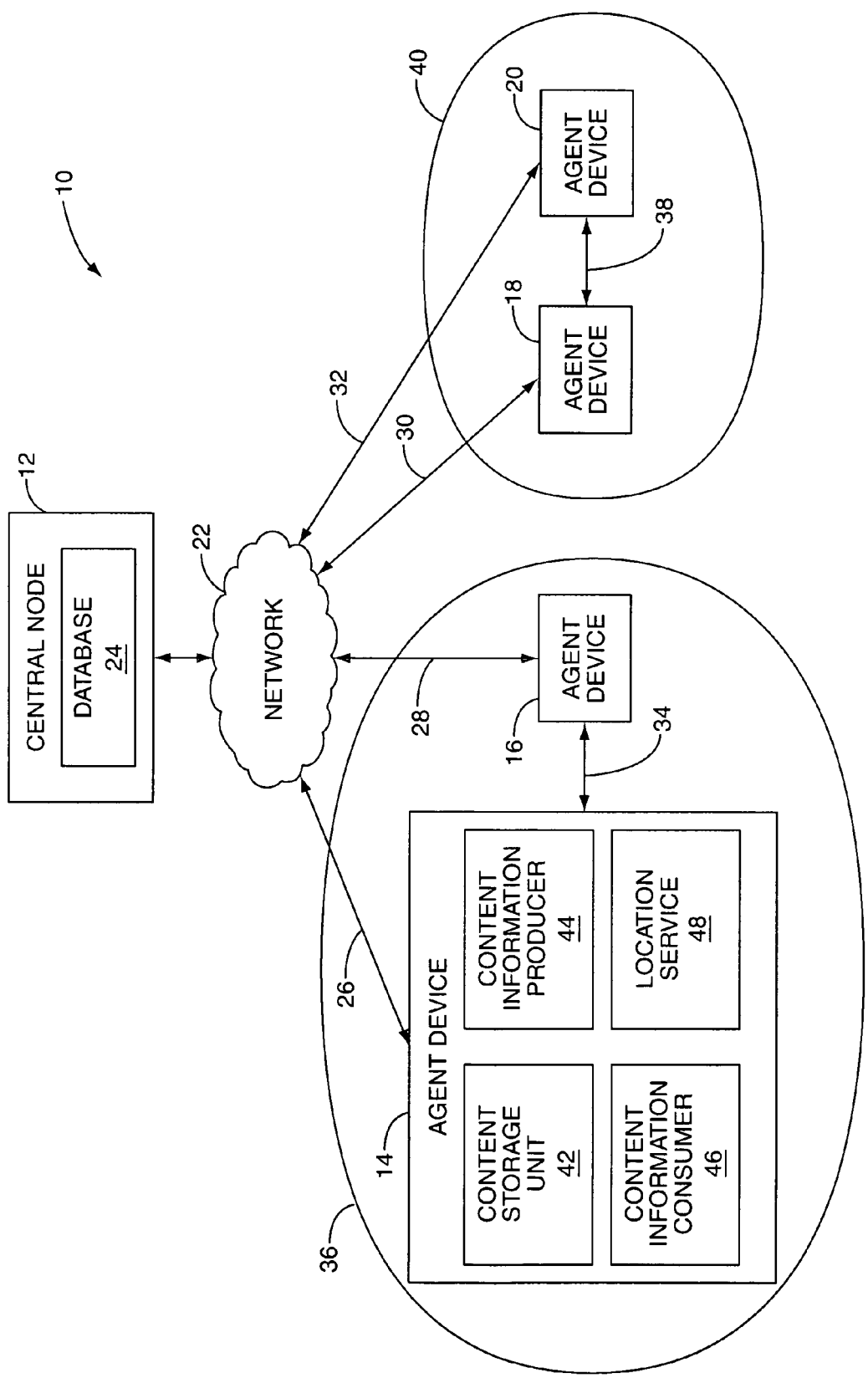
FIG. 1 illustrates a system wherein content information and optionally a location are obtained from a number of agent devices and stored in a database at a central node according to one embodiment of the present invention.

The present invention relates to a system and method for accessing and managing information, or metadata, describing content residing on a number of agent devices. As illustrated in FIG. 1, the present invention may be implemented by a system 10 including a central node 12, agent devices 14-20, and a network 22, such as the Internet. The central node 12 is connected to the network 22 and maintains a database 24 storing content information describing content stored by each of the agent devices 14-20, and optionally, a location for each of the agent devices 14-20. The locations may be stored as actual latitude and longitude coordinates or as any other information identifying the locations of the agent devices 14-20. Although the central node 12 is illustrated as a single network node, the central node 12 may be implemented as a number of servers each maintaining all or a portion of the database 24.

In operation, central node 12 obtains the content information and locations from the agent devices 14-20. The central node 12 may request the content information and locations from the agent devices 14-20 or receive the content information and locations from the agent devices 14-20 automatically. In addition, the central node 12 may obtain periodic updates for the content information and locations of the agent devices 14-20 either by request or automatically. For the content information, the updates may include new content information and information identifying content information to remove from the database 24.

The central node 12 may store the content information and location for the agent devices 14-20 such that the content information and location for an agent device are overwritten when an update is received from the agent device. Alternatively, the central node 12 may store the content information and location for the agent devices 14-20 in a historical fashion. For example, the database 24 may include a current table storing the current information and location for each of the agent devices 14-20 and one or more historical tables storing previous content information and locations for the agent devices 14-20.

As discussed below, the agent devices 14-20 may communicate with the central node 12 to obtain the content information for one or more known agent devices or to query the database 24 to find agent devices having content information and optionally locations that satisfy specified criteria. The central node 12 may additionally or alternatively provide automatic alerts to the agent devices 14-20 when other agent devices matching specified criteria are available.

The agent devices 14-20 may be any mobile or stationary device that is connected to the network 22. As illustrated, the agent devices 14-20 are connected to the network 22 via communication links 26-32. For example, the agent devices 14-20 may be personal computers, Personal Digital Assistants (PDAs), mobile telephones, digital media players such as MP3 players or satellite radios, digital picture frames, a billboard displaying digital content, or the like. If the agent devices 14-20 are mobile devices, the communication links 26-32 may be wireless communication links formed using a cellular communications standard, the Wireless Fidelity (Wi-Fi) standard, one of the IEEE 802.11 standards, or the like.

In this example, the agent devices 14 and 16 are communicatively coupled by a local wireless connection 34, thereby forming a local wireless network 36. The agent devices 18 and 20 are communicatively coupled by a local wireless connection 38, thereby forming a local wireless network 40. The local wireless connections 34 and 38 may be formed using a wireless communication standard such as the Bluetooth standard, the Zigbee standard, one of the IEEE 802.11 standards, or the like. The local wireless networks 36 and 40 are exemplary and intended to illustrate that the agent devices 14-20 are enabled to communicate with one another using a local wireless interface when proximate to one another. As used herein, "proximate" means that a distance between two agent devices is such that communications between the agent devices can be established using the local wireless interface.

The agent device 14 includes a content storage unit 42, a content information producer 44, a content information consumer 46, and optionally a location service 48. Note that the discussion herein of the agent device 14 is equally applicable the agent devices 16-20. Further, while the agent device 14 includes both the content information producer 44 and the content information consumer 46, the agent device 14 may include only one of the content information producer 44 and the content information consumer 46.

The content storage unit 42 may be implemented in memory such as Random Access Memory (RAM) or in a storage device such as a hard disc drive and operates to store various content. The types of content stored in the content storage unit 42 depend on the operations performed by the agent device 14. The content storage unit 42 may store digital assets such as, but not limited to, digital audio files, digital video files, digital images, playlists, bookmarked Uniform Resource Locators (URLs), dialed and received call lists including telephone numbers dialed and telephone numbers from which calls have been received, an address book, and the like. The address book may include information such as a name, mailing address, e-mail address, home page URL, telephone number, and the like for any number of contacts.

The content information producer 44 may be implemented in hardware, software, or a combination thereof and operates to provide content information describing all or a portion of the content stored in the content storage unit 42 and optionally the location of the agent device 14 to the central node 12. The content information producer 44 may provide the content information and location to the central node 12 in response to a request from the central node 12. Alternatively, after initially sending the content information to the central node 12, the content information producer 44 may periodically send updates for the content information and the location of the agent device 14.

The content information and optionally the location are stored in the database 24 in association with an identifier (ID) of the agent device 14. For digital images, the content information may include, but is not limited to, any number of tag values such as International Press Telecommunications Council (IPTC) and Exchangeable Image File (EXIF) tag values. For example, the content information may include one or more keywords, a photo album name, a caption, a location of capture, a date and time of capture, a file name, and the like for each digital image. In a similar fashion, for each digital audio file, the content information may include, but is not limited to, a genre, artist name, album name, title, and file name. For each digital video file, the content information may include information such as, but not limited to, a genre, actor or actress names, title, and file name. The content information may also include playlists, information describing content currently being played by the agent device 14, bookmarked URLs, received and dialed call lists, address books, and the like.

In one embodiment, the content information producer 44 may filter the content information according to predetermined configurations before sending the content information to the central node 12 such that only desired content information is provided to the central node 12. This may be beneficial for security purposes. More specifically, content may be stored in the content storage unit 42 that a user associated with the agent device 14 desires to be kept private. As such, the user may configure the content information producer 44 such that the content information producer 44 filters the private information from the content information and provides only the filtered content information to the central node 12 for storage in the database 24.

As discussed below, the content information producer 44 may also provide the ID of the agent device 14 to the other agent devices 16-20 via a local wireless communication interface when the agent device 14 is proximate to the agent devices 16-20. Preferably, the ID of the agent device 14 is provided as part of a broadcast message including the ID of the agent device 14 and a URL of the central node 12. This may be particularly beneficial where the database 24 is distributed among a number of central nodes each having a different URL. In one embodiment, the broadcast message may be implemented as an Extensible Markup Language (XML) message.

In this example, the agent device 14 is proximate to the agent device 16, and the content information producer 44 may provide the ID of the agent device 14 and optionally the URL of the central node 12 to the agent device 16 via the local wireless connection 34. Optionally, the content information producer 44 may also provide IDs previously obtained from other agent devices. As discussed below, the agent device 16 may then use the ID of the agent device 14 to query the database 24 at the central node 12 to obtain all or a portion of the content information for the agent device 14 and optionally the location of the agent device 14.

The content information consumer 46 may be implemented in hardware, software, or a combination thereof. As discussed below, the content information consumer 46 may: (1) obtain the IDs of ones of the agent devices 16-20 proximate to the agent device 14 and query the database 24 at the central node 12 to obtain the content information and optionally locations for the ones of the agent devices 16-20, (2) query the database 24 at the central node 12 to obtain the ID, content information, and optionally location for ones of the agent devices 16-20 satisfying specified criteria; (3) receive automatic alerts from the central node 12 when ones of the agent devices 16-20 satisfying specified criteria are available; or (4) obtain the IDs of ones of the agent devices 16-20 proximate to the agent device 14 and query the database 24 at the central node 12 to obtain compatibility information for the ones of the agent devices 16-20.

The agent device 14 may optionally include a location service 48 for obtaining the location of the agent device 14. The location service 48 may be a Satellite Positioning System (SPS) receiver such as a Global Positioning System (GPS) receiver or the like. Alternatively, if the agent device 14 has access to a cellular network, the location service 48 may obtain the location of the agent device 14 from the cellular network.

FIG. 2 is a table illustrating an exemplary embodiment of the database 24. In this example, the database 24 stores content information describing digital assets such as digital images and digital audio files stored by each of the agent devices 14-20. As shown, each entry in the database 24 includes the ID of the associated one of the agent devices 14-20, the location of the associated one of the agent devices 14-20, a type of the associated digital asset, a folder name of the folder in which the digital asset is stored at the associated one of the agent devices 14-20, and a file name of the digital asset. In addition, for each digital image, the database 24 stores a photo album name and one or more keywords. For each digital audio file, the database 24 stores a genre, artist name, and album name. Again, the table illustrated in FIG. 2 is exemplary. Various alternative or additional information may be stored in the database 24 as will be apparent to one of ordinary skill in the art. For example, the database 24 may additionally or alternatively include information describing one or more songs or videos in playlists stored on the agent devices 14-20, information describing content currently being played by the agent devices 14-20, bookmarked URLs stored on the agent devices 14-20, received and dialed call lists stored on the agent devices 14-20, information from address books stored on the agent devices 14-20, and the like.

Figure 3:
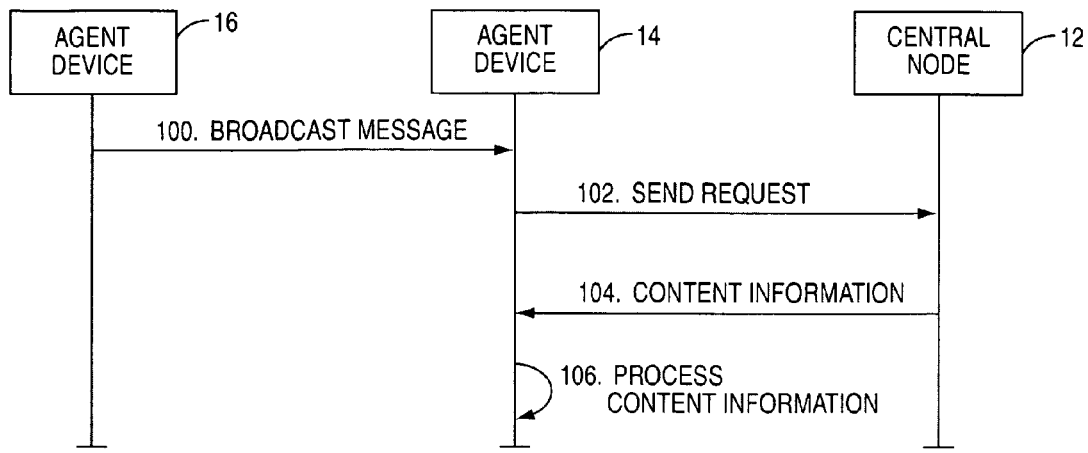
FIG. 3 illustrates an exemplary process of querying the database at the central node of FIG. 1 to obtain content information for an agent device according to one embodiment of the present invention.
Figure 4:
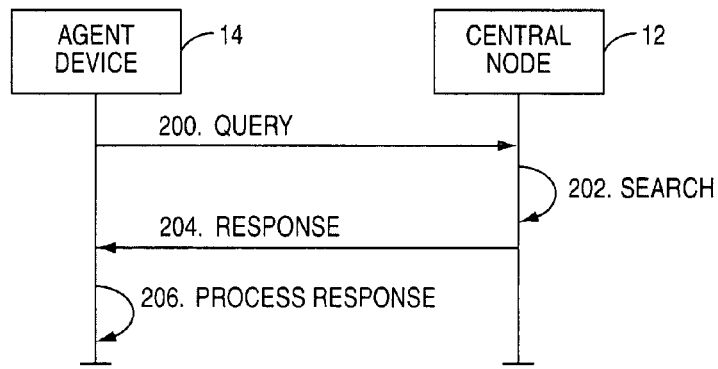
FIG. 4 illustrates an exemplary process wherein an agent device queries the database at the central node of FIG. 1 to find other agent devices satisfying specified criteria according to one embodiment of the present invention.
Figure 5:
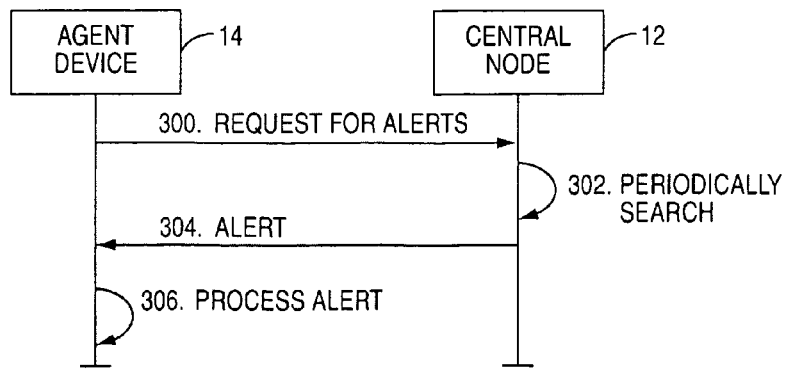
FIG. 5 illustrates an exemplary process wherein the central node of FIG. 1 provides automatic alerts to an agent device when other agent devices satisfying specified criteria are available according to one embodiment of the present invention.
Figure 6:
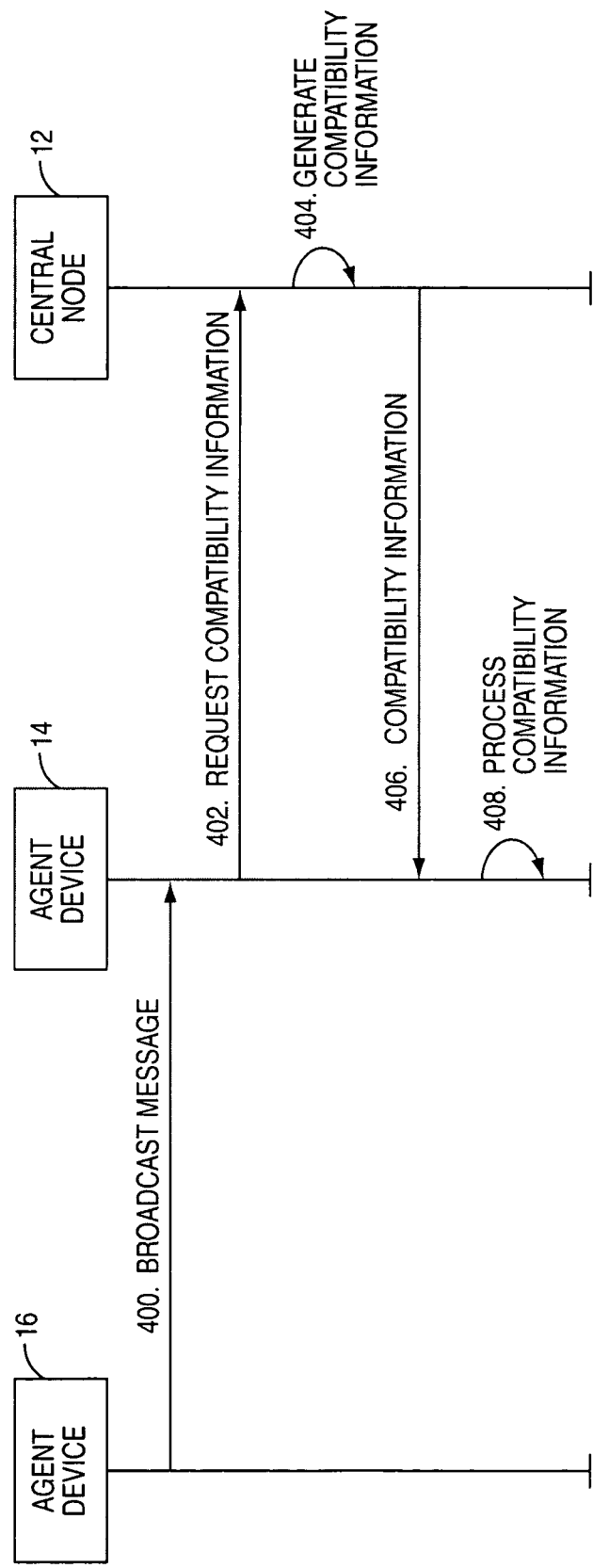
FIG. 6 illustrates an exemplary process for obtaining compatibility information for two agent devices from the central node of FIG. 1 according to one embodiment of the present invention.

FIGS. 3-6 illustrate four functions of the central node 12. In general, FIG. 3 illustrates an exemplary process of querying the database 24 at the central node 12 to obtain content information associated with an ID broadcast by from the agent device 16 to the agent device 14 via the local wireless connection 34. FIG. 4 illustrates an exemplary process wherein the agent device 14 queries the database 24 at the central node 12 to find ones of the agent devices 16-20 satisfying specified criteria. FIG. 5 illustrates an exemplary process wherein the central node 12 provides automatic alerts to the agent device 14 when ones of the agent devices 16-20 satisfying specified criteria are available. FIG. 6 illustrates an exemplary process of requesting a compatibility information for the agent devices 14 and 16.

Regarding FIG. 3, the process begins when the agent device 16 is proximate to the agent device 14, such that the local wireless connection 34 is established. For example, the local wireless connection 34 may be established when a user carrying the agent device 16 enters a room where the agent device 14 is located or when a user carrying the agent device 16 passes by a user carrying the agent device 14 on the street. Using the local wireless connection 34, the agent device 16 provides a broadcast message including the ID of the agent device 16 and optionally the URL of the central node 12 to the agent device 14 (step 100). The agent device 16 may provide the broadcast message in response to a request from the agent device 14 or automatically once the local wireless connection 34 is established. Since the duration of the local wireless connection 34 may be short due to the potentially mobile nature of the agent devices 14 and 16, providing only the broadcast message rather than the content information itself is beneficial.

Note that for security purposes, the content information producer of the agent device 16 may be configured to reject requests from content information consumers associated with agent devices not included in a "buddy" list. Likewise, the content information consumer 46 of the agent device 14 may be configured to only retrieve the content information for agent devices included in a "buddy" list.

The agent device 14 may interact with tens, hundreds, or even thousands of other agent devices. Rather than obtaining content information for each of the agent devices with which it comes into contact, the agent device 14, and specifically the content information consumer 46, may filter received broadcast messages such that content information is requested for only desired agent devices. More specifically, the broadcast message may also include a topic or general description of the agent device 16. Based on the topic or general description, the agent device 14 may determine whether to request the content information for the agent device 16 from the central node 12. For example, the agent device 14 may be an MP3 player and the content information consumer 46 may be manually or automatically configured to request the content information for only other MP3 players. If the topic or general description of the agent device 16 in the broadcast message identifies the agent device 16 as an MP3 player, the content information consumer 46 may determine that the content information for the agent device 16 is to be requested from the central node 12. If the topic or general description of the agent device 16 in the broadcast message identifies the agent device 16 as a satellite radio, the content information consumer 46 may decide that the content information for the agent device 16 is not to be requested from the central node 12. In this manner, the content information consumer 46 may filter received broadcast messages from other agent devices such that only desired content information is requested from the central node 12.

Assuming that the content information for the agent device 16 is to be requested, the content information consumer 46 of the agent device 14 may send a request to the central node 12 for the content information, or a portion thereof, for the agent device 16 (step 102). The request includes the ID of the agent device 16. The content information consumer 46 may request the content information immediately upon receiving the broadcast message from the agent device 16 or at any point in time thereafter. Notably, the content information consumer 46 may not request the content information until after the local wireless connection 34 with the agent device 16 has ended. Further, the content information consumer 46 may request only a portion of the content information for the agent device 16. For example, if the agent device 14 is an audio player, the content information consumer 46 may request only the portion of the content information for the agent device 16 relating to audio content.

Upon receiving the request from the agent device 14, the central node 12 queries the database 24 using the ID of the agent device 16 to obtain the content information for the agent device 16 and provides the content information to the agent device 14 (step 104). Optionally, the central node 12 may also provide the location of the agent device 16 to the agent device 14. The agent device 14 may then process the content information and optionally location for the agent device 16 for a desired purpose (step 106).

For example, the agent device 14 may compare the content information for the agent device 16 with its own content information or preferences to determine compatibility information. For example, the compatibility information may be a compatibility score. If the compatibility score is above a predetermined threshold or if a user of the agent device 14 provides approval based on the compatibility score, the agent device 14 may initiate communication with the agent device 16 either via the local wireless network 36 or the network 22. Communication between the agent devices 14 and 16 may be used for social interaction such as chatting or e-mail, for file transfer, or for resource sharing. For example, a chat session may be established between the agent devices 14 and 16. As another example, an ad-hoc network such as a Mobile Ad-Hoc Network (MANET), Virtual Private Network (VPN), or Darknet may be dynamically created between the agent devices 14 and 16 using local wireless communication or the network 22.

Rather than establishing communication with the agent device 16, the agent device 14 may use the content information for the agent device 16 to influence content played by or settings for the agent device 14. For example, if the agent device 14 is a media player such as an MP3 player, the agent device 14 may select content to play based on the content information of the agent device 16.

Still further, the user of the agent device 14 may decide to contact the user of the agent device 16 via traditional means such as mail, e-mail, or telephone based on the content information or compatibility information for the agent device 16.

Although the exemplary process illustrated in FIG. 3 includes only the agent devices 14 and 16, there may be any number of agent devices in the local wireless network 36. As such, the content information consumer 46 of the agent device 14 may repeat steps 100-104 for each agent device in the local wireless network 36. Thereafter, the agent device 14 may process the content information from each of the agent devices for a desired purpose, as described above.

FIG. 4 illustrates an exemplary process wherein the agent device 14 queries the database 24 at the central node 12 to find ones of the agent devices 16-20 satisfying specified criteria. The process begins when the agent device 14, and more specifically the content information consumer 46, sends a query to the central node 12 (step 200). The query includes criteria specified either by a user of the agent device 14 or automatically by the content information consumer 46. The specified criteria may include a maximum distance or range from the agent device 14, one or more desired values for content information fields, one or more user defined rules, or a combination thereof.

Upon receiving the query, the central node 12 then searches the database 24 to find ones of the agent devices 16-20 satisfying the specified criteria in the query (step 202). For example, the specified criteria may include a maximum distance and a desired music artist. Further, if the maximum desired distance is 100 feet and the desired music artist is Barry Manilow, the central node 12 may search the database 24 to find ones of the agent devices 16-20 located within 100 feet from the agent device 14 that have one or more songs by Barry Manilow. As another example, the specified criteria may include the rule "find agent devices that have at least 50 images and have been in Wilmington, N.C. within the last 6 months." Using historical information stored for the agent devices 16-20, the central node 12 may search for agent devices satisfying this rule. As yet another example, the specified criteria may include the rule "find agent devices that have at least 50 images, have been in Wilmington, N.C. within the last 6 months, and are within 100 feet from me." The central node 12 may search the database 24 for agent devices satisfying this rule.

Once one or more of the agent devices 16-20 satisfying the specified criteria are identified, a response is sent to the agent device 14 (step 204). The response may include the IDs, content information, location, or any combination thereof for each of the identified agent devices. Alternatively, the response may include compatibility information, such as a compatibility score, generated by the central node 12 based on a comparison of the content information for the identified agent devices and the content information and/or user preferences for the agent device 14.

The agent device 14 then processes the response (step 206). For example, the agent device 14 may compare the content information for the identified agent devices with its own content information or preferences to determine compatibility information. For example, the compatibility information may be compatibility scores. If the compatibility scores are above a predetermined threshold or if a user of the agent device 14 provides approval based on the compatibility scores, the agent device 14 may initiate communication with one or more of the identified agent devices either via the local wireless network 36 or the network 322. Rather than establishing communication with the identified agent devices, the agent device 14 may use the content information for the identified agent devices to influence content played by or settings for the agent device 14. Still further, the user of the agent device 14 may decide to contact the users of the identified agent devices via traditional means such as mail, e-mail, or telephone based on the content information or compatibility information for the identified agent devices.

FIG. 5 illustrates an exemplary process wherein the central node 12 provides automatic alerts to the agent device 14 when one or more of the agent devices 16-20 satisfying specified criteria are available. More specifically, the agent device 14 provides a request for alerts to the central node 12 (step 300). The request for alerts includes specified criteria for identifying agent devices of interest to the agent device 14. The specified criteria may include a maximum distance or range from the agent device 14, one or more desired values for content information fields, one or more user defined rules, or a combination thereof.

The central node 12 then periodically searches the database 24 to find ones of the agent devices 16-20 satisfying the specified criteria from the agent device 14 (step 302). For example, the specified criteria may include a maximum distance and a desired music artist. Further, if the maximum desired distance is 100 feet and the desired music artist is Barry Manilow, then the central node 12 may periodically search the database 24 to find agent devices located within 100 feet from the agent device 14 and have one or more songs by Barry Manilow. As another example, the specified criteria may include the rule "find agent devices that have at least 50 images and have been in Wilmington, N.C. within the last 6 months." Using historical information stored for the agent devices 16-20, the central node 12 may periodically search for agent devices satisfying this rule. As yet another example, the specified criteria may include the rule "find agent devices that have at least 50 images, have been in Wilmington, N.C. within the last 6 months, and are within 100 feet from me." The central node 12 may periodically search the database 24 for agent devices satisfying this rule.

When an agent device is found that satisfies the specified criteria, the central node 12 provides an alert to the agent device 14 (step 304). The alert may include the ID, content information, location, or any combination thereof for the agent device satisfying the specified criteria. Alternatively, the alert may include compatibility information generated by the central node 12 based on a comparison of the content information for the agent device satisfying the specified criteria and the content information and/or user preferences for the agent device 14.

The agent device 14 may then process the alert (step 306). For example, the agent device 14 may initiate communication with the agent device satisfying the specified criteria. In one embodiment, the agent device 14 may compare the content information for the agent device satisfying the specified criteria with its own content information or preferences to determine compatibility information. For example, the compatibility information may be a compatibility score. If the compatibility score is above a predetermined threshold or if a user of the agent device 14 provides approval based on the compatibility score, the agent device 14 may initiate communication with the agent device satisfying the specified criteria either via the local wireless network 36 or the network 22. Rather than establishing communication with the agent device satisfying the specified criteria, the agent device 14 may use the content information for the agent device satisfying the specified criteria to influence content played by or settings for the agent device 14. Still further, the user of the agent device 14 may decide to contact the user of the agent device satisfying the specified criteria via traditional means such as mail, e-mail, or telephone based on the content information or compatibility information for the agent device satisfying the specified criteria.

A further refinement of the process in FIG. 5 is to alert the agent device 14 when there is Local Area Network (LAN) proximity to one of the agent devices 16-20 satisfying specified criteria. More specifically, the agent device 14 may notify the central node 12 that it is enabled to work within a LAN. For example, the LAN may be an IEEE 802.11 LAN or a Bluetooth piconet or scatternet. When the agent device 14 is within the same LAN as one of the agent devices 16-20 satisfying the specified criteria, the central node 12 provides an alert to the agent device 14. Thereafter, the agent device 14 may establish communication with the one of the agent devices 16-20 satisfying the specified criteria via the LAN. More specifically, both the agent device 14 and the one of the agent devices 16-20 satisfying the specified criteria may be configured as client devices in the LAN and communication between the agent devices may be established via a server of the LAN rather than directly between the agent devices as described above.

FIG. 6 illustrates a process for obtaining compatibility information from the central node 12. The process is similar to that illustrated in FIG. 3. The process begins when the agent device 16 enters the local wireless network 36 associated with the agent device 14 such that the local wireless connection 34 is established. Using the local wireless connection 34, the agent device 16 provides a broadcast message including the ID of the agent device 16 and optionally the URL of the central node 12 to the agent device 14 (step 400).

The content information consumer 46 of the agent device 14 may then send a request to the central node 12 for compatibility information for the agent device 16 (step 402). The request includes the IDs of the agent devices 14 and 16. The content information consumer 46 may send the request immediately upon receiving the broadcast message from the agent device 16 or at any point in time thereafter. Upon receiving the request from the agent device 14, the central node 12 queries the database 24 using the IDs of the agent devices 14 and 16 to obtain the content information for the agent devices 14 and 16, generates the compatibility information (step 404), and sends the compatibility information to the agent device 14 (step 406). The compatibility information may be generated based on a comparison of the content information for the agent device 16 and the content information and/or preferences for the agent device 14. For example, the preferences may include preferred music artists, preferred keywords for digital images, and the like. Optionally, the central node 12 may also provide the location of the agent device 16 to the agent device 14. The agent device 14 may then process the compatibility information and optionally the location of the agent device 16 for a desired purpose (step 408).

For example, the compatibility information may be a compatibility score. If the compatibility score is above a predetermined threshold or if a user of the agent device 14 provides approval based on the compatibility score, the agent device 14 may initiate communication with the agent device 16 either via the local wireless network 36 or the network 22. Communication between the agent devices 14 and 16 may be used for social interaction such as chatting or e-mail, for file transfer, or for resource sharing. For example, a chat session may be established between the agent devices 14 and 16. As another example, an ad-hoc network such as a Mobile Ad-Hoc Network (MANET), Virtual Private Network (VPN), or Darknet may be dynamically created between the agent devices 14 and 16 using local wireless communication or the network 22.

Still further, the user of the agent device 14 may decide to contact the user of the agent device 16 via traditional means such as mail, e-mail, or telephone based on the compatibility information for the agent device 16.

Figure 7:
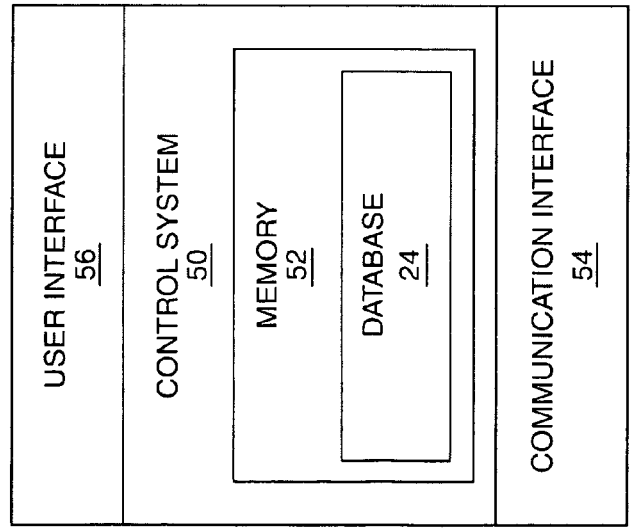
FIG. 7 is a block diagram of an exemplary embodiment of the central node of FIG. 1.

FIG. 7 is a block diagram of an exemplary embodiment of the central node 12. In general, the central node 12 includes a control system 50 having associated memory 52. In this example, the database 24 is implemented in the memory 52. However, the database 24 may be implemented in a separate storage unit such as a hard disc drive. The central node 12 also includes a communication interface 54 communicatively coupling the central node 12 to the network 22. The central node 12 may also include a user interface 56 including components such as a display, keyboard, and the like.

Figure 8:
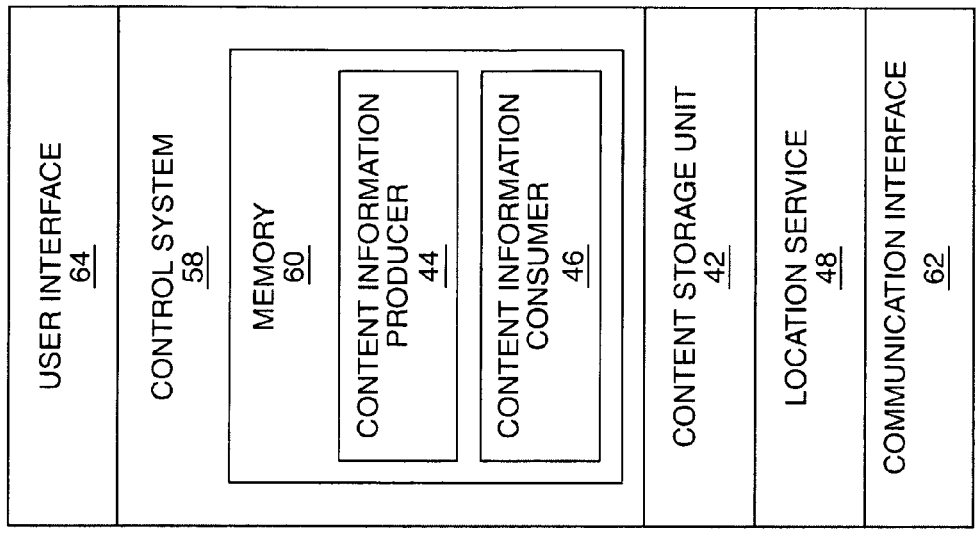
FIG. 8 is a block diagram of an exemplary embodiment of the agent devices of FIG. 1.

FIG. 8 is a block diagram of an exemplary embodiment of the agent device 14. In general, the agent device 14 includes a control system 58 and associated memory 60. In this example, the content information producer 44 and the content information consumer 46 are implemented in software and are stored in the memory 60. Alternatively, the content information producer 44 and the content information consumer 46 may be implemented in hardware or a combination of hardware and software. The agent device 14 also includes the content storage unit 42. The content storage unit 42 may be implemented as memory or as a storage device such as a hard disc drive. Alternatively, the content storage unit 42 may be implemented in the memory 60.

The agent device 14 optionally includes the location service 48. The location service 48 may be implemented in hardware, software, or a combination thereof. In one embodiment, the location service is an SPS receiver. In another embodiment, the location service communicates with a cellular network or the like to obtain the location of the agent device 14.

The agent device 14 also includes a communication interface 62. The communication interface 62 may include a local wireless communication interface operating according to the Bluetooth standard, the Zigbee standard, one of the IEEE 802.11 standards, or the like for communicating with the other agent devices 16-20 when they are proximate to the agent device 14. The communication interface 62 also includes an interface to the network 22. The interface to the network 22 may be wired or wireless. If wireless, the interface to the network 22 may operate according to a cellular communication standard, the Wi-Fi standard, or the like. The agent device 14 may also include a user interface 64 including components such as a display, a keyboard or buttons, speakers, and the like.

As will be apparent to one of ordinary skill in the art, the agent device 14 may include additional hardware, software, or a combination thereof. For example, if the agent device 14 is a media player, the agent device 14 may include additional hardware, software, or a combination thereof enabling the agent device 14 to play media such as digital audio, digital video, or the like.

Those skilled in the art will recognize improvements and modifications to the preferred embodiments of the present invention. All such improvements and modifications are considered within the scope of the concepts disclosed herein and the claims that follow.

What is claimed is:

1. A central node comprising:
   a) a communication interface adapted to communicatively couple the central node to a network; and
   b) a control system associated with the communication interface and adapted to:
      i) obtain content information describing digital media content items digitally stored by a plurality of agent devices;
      ii) store the content information from the plurality of agent devices in a database;
      iii) receive a request from one of a plurality of requesting nodes including the plurality of agent devices for the content information for one of the plurality of agent devices where the request comprises an identifier of the one of the plurality of agent devices that was obtained by the one of the plurality of requesting nodes from the one of the plurality of agent devices when the one of the plurality of agent devices was within a local wireless coverage area of the one of the plurality of requesting nodes; and
      iv) provide at least a subset of the content information for the one of the plurality of agent devices to the one of the plurality of requesting nodes in response to the request.

2. The central node of claim 1 wherein the control system is further adapted to provide information identifying at least a subset of the content information for the at least one of the plurality of agent devices.

3. The central node of claim 1 wherein the control system is further adapted to provide compatibility information for the at least one of the plurality of agent devices.

4. The central node of claim 3 wherein for each agent device of the at least one of the plurality of agent devices, the control system is further adapted to provide the compatibility information for the agent device based on a comparison of at least a subset of the content information for the agent device with at least a subset of the content information of the one of the plurality of requesting nodes.

5. The central node of claim 1 wherein the digital media content items comprise digital images.

6. The central node of claim 1 wherein the digital media content items comprise digital music items.

7. The central node of claim 1 wherein the digital media content items comprise digital video items.

8. The central node of claim 1 wherein the content information comprises playlists.

9. The central node of claim 1 wherein the content information comprises information that identifies digital media content items currently being played by the plurality of agent devices.

* * * * *